US010676402B1

(12) United States Patent
Blachier et al.

(10) Patent No.: US 10,676,402 B1
(45) Date of Patent: Jun. 9, 2020

(54) ULTRALIGHT INORGANIC FOAM AND MANUFACTURE METHOD THEREOF

(71) Applicant: HOLCIM TECHNOLOGY LTD, Jona (CH)

(72) Inventors: Christian Blachier, Saint Quentin Fallavier (FR); Christine Chaumilliat, Saint Quentin Fallavier (FR); Hélène Lombois-Burger, Saint Quentin Fallavier (FR); Serge Sabio, Saint Quentin Fallavier (FR)

(73) Assignee: HOLCIM TECHNOLOGY LTD, Jona (CH)

( * ) Notice: Subject to any disclaimer, the term of this patent is extended or adjusted under 35 U.S.C. 154(b) by 36 days.

(21) Appl. No.: 15/776,693

(22) PCT Filed: Nov. 17, 2016

(86) PCT No.: PCT/FR2016/053000
§ 371 (c)(1),
(2) Date: May 16, 2018

(87) PCT Pub. No.: WO2017/085416
PCT Pub. Date: May 26, 2017

(30) Foreign Application Priority Data

Nov. 17, 2015 (FR) ...................... 15 61057

(51) Int. Cl.
C04B 38/10 (2006.01)
C04B 28/04 (2006.01)
C04B 24/26 (2006.01)
C04B 22/12 (2006.01)
C04B 22/08 (2006.01)
E04B 1/74 (2006.01)
C04B 111/52 (2006.01)
C04B 103/30 (2006.01)
C04B 103/32 (2006.01)
C04B 111/40 (2006.01)

(52) U.S. Cl.
CPC ............ *C04B 38/10* (2013.01); *C04B 22/085* (2013.01); *C04B 22/124* (2013.01); *C04B 24/2647* (2013.01); *C04B 28/04* (2013.01); *E04B 1/74* (2013.01); *C04B 2103/302* (2013.01); *C04B 2103/32* (2013.01); *C04B 2111/40* (2013.01); *C04B 2111/52* (2013.01); *C04B 2201/32* (2013.01)

(58) Field of Classification Search
CPC . C04B 22/085; C04B 22/124; C04B 24/2647; C04B 28/04; C04B 38/10; C04B 2103/32; C04B 2103/302; C04B 2111/40; C04B 2111/52; C04B 2201/32; E04B 1/74
See application file for complete search history.

(56) References Cited

U.S. PATENT DOCUMENTS

| 5,696,174 | A | 12/1997 | Chao et al. | |
|---|---|---|---|---|
| 8,653,186 | B2 * | 2/2014 | Nicoleau | C04B 28/02 524/791 |
| 2012/0286190 | A1 * | 11/2012 | Prat | C04B 28/06 252/62 |
| 2013/0035423 | A1 * | 2/2013 | Sabio | C04B 22/0086 524/5 |
| 2017/0158568 | A1 * | 6/2017 | Lombois-Burger | C04B 28/02 |
| 2018/0354854 | A1 * | 12/2018 | Chaumilliat | C04B 22/148 |
| 2018/0354855 | A1 * | 12/2018 | Neyrand | C04B 38/10 |

FOREIGN PATENT DOCUMENTS

| CN | 102838333 A | * 12/2012 |
|---|---|---|
| CN | 102838375 A | * 12/2012 |
| FR | 2 958 931 A1 | 10/2011 |
| WO | WO 2010/026155 A1 | 3/2010 |
| WO | WO 2011/086333 A2 | 7/2011 |
| WO | WO 2013/150148 A1 | 10/2013 |
| WO | WO 2016/097181 A1 | 6/2016 |

OTHER PUBLICATIONS

International Search Report as issued in International Patent Application No. PCT/FR2016/053000, dated Jan. 16, 2017.
Preliminary Search Report as issued in French Patent Application No. 1561057, dated Jul. 19, 2016.

* cited by examiner

*Primary Examiner* — Anthony J Green
(74) *Attorney, Agent, or Firm* — Pillsbury Winthrop Shaw Pittman LLP

(57) ABSTRACT

A process for manufacturing an inorganic foam includes (i) separately preparing an aqueous foam and a cement slurry, the cement slurry including water W, a cement C, a water-reducing agent, a water-soluble calcium salt, a water-soluble silicate salt, the calcium/silicon molar ratio being 0.7 to 1.7 and the W/C weight ratio being 0.25 to 0.40, and given that the calcium ion concentration is 0.03 to 0.97%, expressed as weight percent relative to the weight of the cement, and that the silicate ion concentration is 0.04 to 1.67%, expressed as weight percent relative to the weight of the cement; (ii) contacting the cement slurry obtained with the aqueous foam to obtain a foamed cement slurry; and (iii) shaping the foamed cement slurry obtained in step (ii) and allowing setting to occur.

17 Claims, No Drawings

ULTRALIGHT INORGANIC FOAM AND MANUFACTURE METHOD THEREOF

CROSS-REFERENCE TO RELATED APPLICATIONS

This application is the U.S. National Stage of International Application Serial No. PCT/FR2016/053000, filed Nov. 17, 2016, which in turn claims priority to French Application No. 1561057, filed Nov. 17, 2015. The contents of all of these applications are incorporated herein by reference in their entirety.

The present invention relates to an ultralight cement-based inorganic foam, to a process for producing this foam, and to construction elements comprising this foam.

In general, inorganic foam, in particular cement foam, is highly advantageous for numerous applications on account of its properties, such as thermal insulation, sound insulation, durability and fire resistance, and its ease of use.

Inorganic foam designates a material in the form of a foam. This material is lighter than traditional concrete because of the pores or voids contained therein. These pores or voids are due to the presence of air in the inorganic foam and can be in the form of bubbles. By ultralight foam is meant a foam having a dry density generally of 20 to 300 kg/m³.

When an element made of inorganic foam is cast, it may collapse, for example through lack of stability of the inorganic foam when it is placed or before complete hardening. These problems of foam collapse can be due to phenomena of coalescence, Ostwald ripening, hydrostatic pressure or drainage, the latter particularly being more extensive in very tall elements.

The difficulty in producing inorganic foams is therefore to manufacture a stable foam which overcomes these problems of collapse. However, the known techniques for producing a sufficiently stable foam rely upon mixtures of cementitious compounds comprising numerous admixtures, which are therefore difficult and costly to produce.

For example, in U.S. Pat. No. 5,696,174 the simultaneous use of (I) cationic and (II) anionic compounds has already been proposed for producing foams. Such cementitious foams comprise ammonium stearate as anionic component and a cationic component called Arquad T.

Application WO 2013/150148 describes cement-based foams comprising various admixtures. These foams can comprise calcium aluminate to allow rapid setting or fine inorganic particles in addition to Portland cement. Nevertheless, the lowest densities achieved with this process are generally limited to 100 kg/m³.

Patent application WO 2011/086333 describes inorganic foams based on aluminous cements. The high reactivity of these cements certainly allows the formation of stable and homogeneous inorganic foams, but the high cost of these cements, and their high reactivity, make this invention, in very many cases, difficult for users to employ.

In order to meet user requirements, it has become necessary to find a means for producing an ultralight, highly-stable inorganic foam, which is simple and inexpensive to produce.

Thus, the problem which the invention proposes to solve is to find a formulation for a stable, ultralight inorganic foam, which does not collapse when the foam is poured vertically, and which is relatively easy and inexpensive to prepare.

The invention relates to a process for manufacturing an inorganic foam comprising the following steps:

(i) separately preparing an aqueous foam and a cement slurry, the cement slurry comprising water W, a cement C, a water-reducing agent, a water-soluble calcium salt, a water-soluble silicate salt, the calcium/silicon molar ratio being 0.7 to 1.7 and the W/C weight ratio being 0.25 to 0.40, and given that the calcium ion concentration is 0.03 to 0.97%, expressed as weight percent relative to the weight of the cement C, and that the silicate ion concentration is 0.04 to 1.67%, expressed as weight percent relative to the weight of the cement C;

(ii) contacting the cement slurry obtained with the aqueous foam to obtain a foamed cement slurry; and (iii) shaping the foamed cement slurry obtained in step (ii) and allowing setting to occur.

Preferably, the water W is water from the municipal water system, or water drawn from a natural environment.

A cement C is a hydraulic binder comprising a proportion at least equal to 50 wt % of calcium oxide (CaO) and of silicon dioxide ($SiO_2$). A cement can therefore comprise other compounds in addition to CaO and $SiO_2$, and in particular Portland clinker, slag, silica fume, pozzolanas (natural and natural calcined), fly ashes (siliceous and calcareous), shale and/or limestone.

The cement C used according to the process of the invention can be any type of cement regardless of its chemical composition, and in particular regardless of its alkali content. Thus, it is advantageous according to this process of the invention not to have to select a particular cement. Advantageously, the cement C used to carry out the invention is preferably selected from the commercially-available cements.

Advantageously, the cement C used in the cement slurry used according to the process of the invention comprises more than 70 wt %, advantageously more than 80 wt %, more advantageously more than 90 wt % Portland clinker.

This cement C is used according to the process of the invention in the presence of a specific amount of water W in the slurry, characterized by the W/C weight ratio.

Preferably, the W/C ratio of the cement slurry is from 0.25 to 0.38, more preferentially from 0.28 to 0.35, expressed by weight.

The cement C used according to the process of the invention to prepare inorganic foams can be selected from the cements described in standard NF-EN197-1 of April 2012, in particular the cements of type CEM I, CEM II, CEM III, CEM IV, or CEM V. According to a variant, the cement C can also be a cement compound comprising a mixture of CEM I and of pozzolanic materials and/or of limestone crushed beforehand, this cement being made directly during the preparation of the cement slurry according to the process of the invention. This cement can be made by using mineral additions, as described below in the description.

Preferably, the cement C used according to the process of the invention to prepare inorganic foams is a cement of type CEM I.

According to a particular embodiment, the cement which may be suitable for use according to the present invention has a Blaine specific surface area of 3,000 to 10,000 cm²/g, preferably 3,500 to 6,000 cm²/g.

The cement slurry used in the process of the invention can advantageously comprise a water-reducing agent of type plasticizer or superplasticizer. A water-reducing agent makes it possible to reduce by about 10 to 15 wt % the amount of mixing water for given workability time. By way of example of water-reducing agents, mention may be made of ligno-sulphonates, hydroxycarboxylic acids, carbohydrates and other specific organic compounds such as, for example, glycerol, polyvinyl alcohol, sodium aluminomethyl siliconate, sulphanilic acid and casein (see Concrete Admixtures Handbook, Properties Science and Technology, V. S. Ramachandran, Noyes Publications, 1984). Superplasticizers belong to the new generation of water-reducing agents and make it possible to reduce by about 30 wt % the amount of mixing water for a given workability time. By way of example of superplasticizers, mention may be made of PCP superplasticizers free of anti-foaming agent, PEO diphosphonates and PEO polyphosphates. The term "PCP" or "polycarboxylate polyoxide", according to the present invention, is intended to include a copolymer of acrylic or methacrylic acids, and of their poly(ethylene oxide) (PEO) esters.

Preferably, the cement slurry used to produce the inorganic foam of the invention comprises from 0.05 to 1.00%, more preferentially from 0.05 to 0.5%, of a water-reducing agent, a plasticizer or a superplasticizer, percentage expressed in dry weight relative to the weight of the cement C.

Preferably, the water-reducing agent of type plasticizer or superplasticizer does not comprise anti-foaming agent.

The cement slurry or the aqueous foam can also comprise from 0.05 to 2.5% of a cement setting accelerator, percentage expressed in dry weight relative to the cement C.

The cement slurry prepared in step (i) of the process of the invention comprises a water-soluble calcium salt.

The water-soluble calcium salt can be in powder or liquid form, in anhydrous or hydrated form.

Preferably, the water-soluble calcium salt has a water solubility at 20° C. higher than 2 g/100 mL.

Preferably, the calcium ion concentration in the cement slurry is from 0.05 to 0.60%, more preferentially from 0.05 to 0.45%, percentage expressed by weight relative to the weight of the cement C.

Preferably, the water-soluble calcium salt is selected from calcium chloride, calcium nitrate, calcium formate, calcium acetate, calcium chlorate, calcium bromide, calcium lactate, calcium nitrite, calcium propionate, calcium hydrogen carbonate, calcium iodide and mixtures thereof.

The cement slurry prepared in step (i) of the process of the invention comprises a water-soluble silicate salt.

Preferably, the water-soluble silicate salt can be in powder or liquid form, in anhydrous or hydrated form.

Preferably, the water-soluble silicate salt has a water solubility at 20° C. higher than 2 g/100 mL.

Preferably, the silicate ion concentration in the cement slurry is from 0.11 to 1.00%, more preferentially from 0.11 to 0.66%, percentage expressed by weight relative to the weight of the cement C.

Preferably, the water-soluble silicate salt is selected from the family of sodium silicates (metasilicate, orthosilicate, pyrosilicate), the family of potassium silicates (metasilicate, orthosilicate, pyrosilicate), silicic acid and mixtures thereof. Soluble alkali silicates are generally described by the following general formula: $M_2O\text{-}nSiO_2$, where M is Na or K and n is the molar ratio of the number of moles of silica dioxide ($SiO_2$) per mole of metal oxide ($M_2O$).

Preferably, the calcium/silicon molar ratio is from 0.8 to 1.6, more preferentially from 0.8 to 1.5.

Other admixtures can be added either to the cement slurry or to the aqueous foam. For example, such admixtures can be a thickening agent, a viscosifying agent, an air entraining agent, a cement setting retarder, a clay inerting agent, pigments, dyes, hollow glass beads, film-forming agents, hydrophobic or cleaning agents (such as zeolites or titanium dioxide, for example), latexes, organic or mineral fibres, mineral additions or mixtures thereof.

Preferably, the admixtures used do not comprise anti-foaming agent.

Preferably, the inorganic foam of the invention comprises a mineral addition. This mineral addition can be added to the cement slurry during the process of the invention.

For example, the mineral additions are slags (e.g., as defined in standard NF EN 197-1 of April 2012, paragraph 5.2.2), pozzolanas (e.g., as defined in standard NF EN 197-1 of April 2012, paragraph 5.2.3), fly ashes (e.g., as defined in standard NF EN 197-1 of April 2012, paragraph 5.2.4), burnt shales (e.g., as defined in standard NF EN 197-1 of April 2012, paragraph 5.2.5), calcium carbonate-based materials, such as limestone (e.g., as defined in standard NF EN 197-1 of April 2012, paragraph 5.2.6), silica fumes (e.g., as defined in standard NF EN 197-1 of April 2012, paragraph 5.2.7), metakaolins or mixtures thereof.

A formulation according to the invention allows considerable savings in time and cost and goes against preconceived technical opinion according to which the use of various admixtures is necessary to ensure the stability of a cement foam.

Preferably, the inorganic foam of the invention comprises substantially no fine particles. The expression "fine particle" is intended to mean a population of particles having a median diameter D50 strictly lower than 2 μm. D50, also denoted $D_v50$, corresponds to the $50^{th}$ percentile of the particle-size volume distribution, i.e., 50% of the volume consists of particles smaller than D50 and 50% larger than D50.

The term "substantially" is intended to mean less than 1%, advantageously less than 5%, expressed by weight relative to the weight of the cement.

According to another aspect of the invention, the inorganic foam of the invention does not contain a mixture of two organic compounds respectively forming a long-chain anionic compound and a long-chain cationic compound as described in U.S. Pat. No. 5,696,174.

The cements having little or no suitability for the implementation of the invention are calcium aluminate cements or mixtures thereof. Calcium aluminate cements are cements generally comprising a mineralogical phase C4A3$, CA, C12A7, C3A or C11A7CaF$_2$ or mixtures thereof, for instance the Ciments Fondue, aluminous cements, sulphoaluminate cements, calcium aluminate cements conforming to European standard NF EN 14647 of December 2006. Such cements are characterized by an aluminium oxide ($Al_2O_3$) content greater than or equal to 35 wt %.

According to a first embodiment, the cement slurry can be prepared by loading the water, the admixtures (e.g., the water-reducing agent), the calcium salts and the silicate salts into a mixer. The cement, and optionally all the other materials in powder form, are then loaded into the mixer. The paste obtained is mixed to obtain a cement slurry.

Preferably, the cement slurry is stirred, for example with a deflocculating blade, the speed of which can vary from 1000 rpm to 400 rpm as a function of slurry volume, throughout the entire duration of the process for manufacturing the inorganic foam of the invention.

According to a second embodiment, the cement slurry can be prepared by loading part of the water and the admixtures (e.g., the water-reducing agent), the calcium salts and the silicate salts into a mixer, then the cement and then the other compounds.

According to a third embodiment, the cement slurry can be prepared by loading a mixer with the cement, and optionally all other materials in powder form. The cement and the powders can be mixed to obtain a homogeneous mixture. The water, the admixtures (e.g., the water-reducing agent), the calcium salts and the silicate salts are then loaded into the mixer.

According to a fourth embodiment, the cement slurry can be generated continuously by having first prepared a mixture comprising the water with the admixtures (e.g., the water-reducing agent), the calcium salts and the silicate salts.

The aqueous foam can be prepared by contacting the water with a foaming agent, then by adding a gas therein. Therefore, the aqueous foam comprises water and a foaming agent. This gas is preferably air. The amount of foaming agent is generally from 0.25 and 5.00% by weight of foaming agent dry matter relative to the weight of water, preferably from 0.75% to 2.50%. The adding of air can be performed by stirring, bubbling or pressure injection. Preferably, the aqueous foam can be prepared using a turbulence foamer (bed of glass beads, for example). This type of foamer allows air to be added under pressure to an aqueous solution comprising a foaming agent.

Preferably, the aqueous foam can be generated continuously.

The generated aqueous foam has an air bubble size having a D50 which is less than or equal to 400 µm, preferably which is from 100 to 400 µm, more preferentially from 150 to 300 µm. D50, also denoted $D_v50$, corresponds to the 50th percentile of the particle-size volume distribution, i.e., 50% of the volume consists of particles smaller than D50 and 50% larger than D50.

Preferably, the generated aqueous foam has an air bubble size having a D50 equal to 250 µm.

The D50 of the bubbles is measured by backscattering. The apparatus used is Turbiscan® Online provided by the Company Formulaction. Backscattering measurements allow an estimate of the D50 for bubbles of an aqueous foam, with knowledge of the volume fraction of the bubbles and the refractive index of the foaming agent solution.

Preferably, the foaming agent is an organic derivative of proteins of animal origin (e.g., the foaming agent Propump26, hydrolysed keratin powder sold by the Company Propump) or of plant origin. The foaming agents can also be cationic (e.g., cetyltrimethylammonium CTAB), anionic, amphoteric (e.g., cocoamidopropyl betaine CAPB) or non-ionic surfactants, or mixtures thereof.

The contacting of the cement slurry with the aqueous foam to obtain a foamed cement slurry can be performed by any means, for example using a static mixer.

According to a more particular embodiment, the cement slurry is pumped at a constant volume rate as a function of the composition of the target foamed cement slurry. The cement slurry is then contacted with the aqueous foam already circulating in the circuit of the process. The foamed cement slurry according to the invention is thus generated. This foamed cement slurry is shaped and allowed to set.

Advantageously, the process of the invention requires no autoclave step, nor curing step, nor heat treatment step at 60-80° C., for example, in order to obtain a cement foam of the invention.

An object of the invention is also a foamed cement slurry which can be obtained in step (ii) of the process of the invention.

Another object of the present invention is an inorganic foam obtainable by the process of the invention.

The inorganic foam of the invention can be prefabricated or prepared directly at a worksite by installing an on-site foaming system.

Preferably, the inorganic foam of the invention has a dry density of 20 to 300 kg/m$^3$, more preferentially of 20 to 150 kg/m$^3$, even more preferentially of 30 to 80 kg/m$^3$. It should be noted that the density of the foamed cement slurry (wet density) differs from the density of the inorganic foam (density of hardened material).

Preferably, the inorganic foam of the invention has a thermal conductivity of 0.030 to 0.150 W/(m·K), preferably of 0.030 to 0.060 W/(m·K) and more preferentially of 0.030 to 0.055 W/(m·K), the margin of error being ±0.4 mW/(m·K).

Advantageously, the inorganic foam of the invention has a very good fire resistance.

The invention also relates to a construction element comprising an inorganic foam of the invention.

The use of the inorganic foam of the invention in the construction sector is also an object of the invention. For example, the inorganic foam of the invention can be used to cast walls, floors and roofing during construction. It is also envisaged to produce prefabricated elements, such as blocks and panels, from the foam of the invention at a prefabrication plant.

The invention also relates to the use of the inorganic foam of the invention as insulating material, in particular as thermal or sound insulation.

Advantageously, the inorganic foam of the invention in certain cases allows the replacement of glass wool, mineral wool, or insulators made of polystyrene and polyurethane.

Preferably, the inorganic foam of the invention thus has a very low thermal conductivity. Reducing the thermal conductivity of building materials is highly desirable since it brings savings in heating energy in commercial and residential buildings. In addition, the inorganic foam of the invention allows good insulation performance to be obtained with small thicknesses, thereby preserving habitable surfaces and volumes. Thermal conductivity (also called lambda ($\lambda$)) is a physical quality characterizing the behaviour of materials during conductive heat transfer. Thermal conductivity represents the amount of heat transferred per unit area and per unit time under a temperature gradient. In the international system of units, thermal conductivity is expressed in watts per metre-kelvin (W/(m·K)). Conventional or traditional concretes have a thermal conductivity between 1.3 and 2.1 measured at 23° C. and 50% relative humidity. The inorganic foam of the invention can be selected from foams having a thermal conductivity of 0.030 to 0.150 W/(m·K), preferably of 0.030 to 0.060 W/(m·K) and more preferentially of 0.030 to 0.055 W/(m·K), the margin of error being ±0.4 mW/(m·K).

Advantageously, the inorganic foam of the invention can be used for filling an empty or hollow space of a building, a wall, a partition, a masonry block, e.g., a breeze block, a brick, a floor or a ceiling. Such composite construction materials or elements comprising the inorganic foam of the invention are also objects of the invention per se.

Advantageously, the inorganic foam of the invention can be used as façade cladding, for example for the external insulation of a building. In this case, a finish coat may be applied to the inorganic foam of the invention.

Another object of the invention is a device comprising the inorganic foam of the invention. The foam can be present in the device as insulating material. The device of the invention is advantageously able to resist or reduce air and thermo-hydric transfer, i.e., this element has controlled permeability of transfer of air or of water in vapour or liquid form.

The device of the invention preferably comprises at least one frame or structural element. This frame can be made of concrete (posts/beams), metal (upright or rail), wood, plastic or composite material, or synthetic material. The inorganic foam of the invention may also surround a structure, for example a lattice (plastic, metal).

The inorganic foam of the invention can also be used to fill the hollow parts of masonry blocks, for example hollow bricks or breeze blocks, the foam which can be injected at any stage of the fabrication of masonry blocks.

The device of the invention can be used to form or manufacture a lining, an insulation system, or a partition, for example a dividing partition, a load distribution partition or a wall lining.

The inorganic foam of the invention can be cast vertically between two walls selected for example from concrete shells, brick walls, plasterboards, wood board, for example oriented thin strip wood panels, or fibre-cement panels, the whole forming a device.

The invention will be better understood by reading the following non-limiting examples.

The following measurement methods were used:
Laser Particle-Size Method

The particle-size curves of the various powders are obtained using a Malvern Mastersizer 2000 laser particle-size analyser (year 2008, serial number MAL1020429).

Measurement is carried out in a suitable medium (e.g., in aqueous medium for nonreactive particles, or in alcohol medium for reactive materials) in order to disperse the particles; the particle-size must be from 1 µm to 2 mm. The light source is a red He—Ne laser (632 nm) and a blue diode (466 nm). The Fraunhofer optical model is used with a polydisperse particle-sizing standard.

Measurement of background noise is first performed using a pump rate of 2000 rpm, an agitator speed of 800 rpm and noise measurement over 10 s, in the absence of ultrasound. It is first verified that the light intensity of the laser is at least 80%, and that a decreasing exponential curve is obtained for background noise. If this is not the case, the cell lenses must be cleaned.

A first measurement is taken on the sample with the following parameters: pump speed 2000 rpm, agitator speed 800 rpm, no ultrasound, obscuration limit between 10 and 20%. The sample is inserted to obtain obscuration slightly higher than 10%. After stabilisation of obscuration, measurement is conducted with a time between immersion and measurement set at 10 s. Measurement time is 30 s (30,000 diffraction images analysed). In the size distribution graph obtained, consideration must be given to the fact that part of the powder population may be agglomerated.

A second measurement is then carried out (without emptying the vessel) with ultrasound. The pump rate is increased to 2500 rpm, agitation to 1000 rpm, and with 100% ultrasound emission (30 watts). This regime is maintained for 3 minutes before returning to the initial parameters: pump rate 2000 rpm, agitator speed 800 rpm, no ultrasound. After 10 s (to evacuate any air bubbles), a 30 s measurement is performed (30,000 images analysed). This second measurement corresponds to a powder de-agglomerated by ultrasonic dispersion.

Each measurement is repeated at least twice to verify the stability of the result. The apparatus is calibrated before each work session using a standard sample (Sifraco C10 silica) having a known particle-size curve. All the measurements given in the description and the given ranges correspond to the values obtained with ultrasound.

Blaine Method for Measuring Specific Surface Area

The specific surface area of the various materials is measured as follows.

The Blaine method at 20° C. with a relative humidity not exceeding 65% using a Blaine Euromatest Sintco apparatus conforming to European standard EN 196-6.

Before measuring the specific surface area, the wet samples are dried to constant weight in an oven at a temperature of 50 to 150° C. (the dried product is then ground to obtain a powder having a maximum particle size of 80 µm or less).

EXEMPLARY EMBODIMENTS

The process of the invention was put into practice to prepare inorganic foams according to the invention B, D, F, H, J, L, N, O from cement slurry of formulas II, IV, VI, VIII and X. Comparative examples of cement foams G, I, K, M obtained using cement slurries V, VII and IX were also prepared so as to show the advantageous aspects of the process of the invention.

Materials:

The cements used are Portland cements from various Lafarge cement plants identified by location name as specified in Table (I). These cements are standard type cements. The letters "R" and "N" correspond to the definition of standard NF EN 197-1, version of April 2012.

The superplasticizer used is a mixture comprising a polycarboxylate polyoxide (PCP) from the Company Chryso called Chrysolab EPB530-017 and not comprising anti-foaming agent. The dry extract of Chrysolab EPB530-017 is 48%, percentage by weight.

The calcium salt used is a mixture of calcium chloride and calcium nitrate from the Company Chryso called ChrysoXel CBP. The dry extract of Chrysoxel CBP is 52%, percentage by weight.

The silicate salt used is a sodium silicate from Chryso called ChrysoJet RS38. The dry extract of ChrysoJet RS38 is 38%, percentage by weight.

The foaming agents used are derivatives of animal proteins as follows:

Propump26 from the Company Propump having a dry extract of 26%;

MAPEAIR L/LA from the Company MAPEÏ having a dry extract of 26%, percentage by weight.

The water is tap water.

Equipment Used:
Rayneri Mixer:
    A Turbotest mixer (MEXP-101, model Turbotest 33/300, serial number: 123861) provided by the Company Rayneri. It is a vertical-axis mixer.
Pumps:
    A Seepex™ MD 006-24 eccentric screw pump, commission no. 244920.
    A Seepex™ MD 006-24 eccentric screw pump, commission no. 278702.
Foamer:
    A foamer composed of a bed of SB30 glass beads having a diameter of 0.8 to 1.4 mm packed in a tube of length 100 mm and diameter 12 mm.
Static Mixer:
    A static mixer composed of 32 helical elements of type Kenics, diameter 19 mm, item number 16La632 by ISOJET.

In the following examples, inorganic foams were prepared. Each cement slurry is listed with a number from II to X and each aqueous foam is numbered 1 or 2. The cement foam (or inorganic foam according to the invention) obtained is a combination of one of these cement slurries with one of these aqueous foams.

I. Preparation of Inorganic Foams

I.1 Preparation of a Cement Slurry

The chemical compositions of the various cement slurries used to carry out the invention are presented in Table I. The slurries were prepared using the Rayneri Turbotest 33/300 mixer by first loading the liquid components (water, water-reducing agent, calcium salts and silicate salts). Under stirring (1000 rpm), the solids (cement and all the materials in powder form) are gradually added. The slurry was then mixed for another 2 minutes.

TABLE I

Formulation of the cement slurries

|  | II | IV | V | VI | VII | VIII | IX | X |
|---|---|---|---|---|---|---|---|---|
| Cement type | CEM I 52,5N | CEM I 52,5N | CEM I 52,5N | CEM I 52,5N | CEM I 52,5N | CEM I 52,5N | CEM I 52,5N | CEM I 52,5N |
| Lafarge plant | Le Havre | Le Havre | Saint Pierre La Cour | Saint Pierre La Cour | Austria | Austria | Val d'Azergues | Val d'Azergues |
| W/C ratio (by weight) | 0.29 | 0.33 | 0.29 | 0.29 | 0.33 | 0.33 | 0.29 | 0.29 |
| Soluble Na2O eq. (%) | 0.22 | 0.22 | 0.66 | 0.68 | 0.30 | 0.30 | 0.40 | 0.40 |
| Cement (weight % in the slurry) | 76.54 | 74.28 | 77.43 | 75.65 | 75.10 | 74.26 | 77.44 | 76.52 |
| Water (weight % in the slurry) | 20.69 | 23.06 | 22.34 | 19.25 | 24.71 | 23.02 | 22.38 | 20.88 |
| Superplasticizer (weight % in the slurry) | 0.19 | 0.16 | 0.23 | 0.24 | 0.19 | 0.21 | 0.20 | 0.23 |
| Calcium salt (weight % in the slurry) | 1.19 | 1.35 | 0 | 2.03 | 0 | 1.14 | 0 | 1.18 |
| Sodium silicate (weight % in the slurry) | 1.39 | 1.16 | 0 | 1.83 | 0 | 1.37 | 0 | 1.41 |
| Calcium ions (dry weight % relative to the cement) | 0.24 | 0.28 | 0 | 0.42 | 0 | 0.24 | 0 | 0.24 |
| Silicate ions (dry weight % relative to the cement) | 0.43 | 0.37 | 0 | 0.57 | 0 | 0.44 | 0 | 0.44 |
| Ca/Si molar ratio | 1.07 | 1.45 | 0 | 1.38 | 0 | 1.04 | 0 | 1.04 |

I.2 Preparation of the Aqueous Foam

An aqueous solution containing the foaming agent was placed in a vessel. The composition of this aqueous solution of foaming agent (in particular the concentration and the nature of the foaming agent) is presented in Table II. The foaming agent solution was pumped through the Seepex™ MD 006-24 volumetric eccentric screw pump (commission no.: 278702).

This foaming agent solution was passed through the bead bed of the foamer together with pressurized air (range from 1 to 6 bar) using a T-junction. The aqueous foam was generated continuously at the flow rate indicated in Table II.

TABLE II formulation of aqueous foams and flow rate

|  | Aqueous foam number | |
|---|---|---|
|  | 1 | 2 |
| Foaming Agent | Propump26 | MapeAIR L/LA |
| Concentration (weight % relative to the water of the aqueous foam) | 3.5 | 2.5 |
| Air Flow Rate (L/min) | 8 | 8 |
| Solution Flow Rate (L/min) | 0.418 | 0.410 |

I.3 Preparation of a Foamed Cement Slurry:

The previously obtained cement slurry was poured into the mixing vessel under stirring (400 rpm). The slurry was pumped using a Seepex™ MD 006-24 volumetric eccentric screw pump (commission no.: 244920).

The pumped slurry and the preceding aqueous foam, generated continuously, were placed in contact in the static mixer. The aqueous foam is generated by abiding by the flow rates specified in Table II.

The cement slurry is pumped at a flow rate of about 0.285 L/min in order to obtain a foamed cement slurry with a wet density of about 110 kg/m$^3$ (example B, D, F, G, H, I, J, K, L, M, N). The foamed cement slurry is thus generated. The volume of cement slurry used is at this density about 33 L/m$^3$ and the volume of aqueous foam about 967 L/m$^3$.

The cement slurry is pumped at a flow rate of about 0.160 L/min in order to obtain a foamed cement slurry with a wet density of about 85 kg/m3 (example O). The foamed cement slurry is thus generated. The volume of cement slurry used is at this density about 19 L/m$^3$ and the volume of aqueous foam about 981 L/m$^3$.

I.4 Production of an Inorganic Foam

The foamed cement slurry was cast into polystyrene cubes having sides of 10×10×10 cm and into cylindrical columns 2.50 m in height and 20 cm in diameter. Three cubes were prepared for each foamed slurry. The cubes were unmoulded after 1 day and then stored for 7 days at 100% relative humidity and 20° C. The cubes were then dried at 45° C. to constant weight. A column was formed with some of the foamed slurries. The columns were unmoulded between 3 and 7 days later and then cut into sections 25 cm in length. The sections were dried at 45° C. to constant weight.

II. Analysis of the Inorganic Foam

II.1 Stability of the Inorganic Foam

The stability of the foams was measured simply by visual inspection of the cubes generated before unmoulding. A foam was described as "stable" if the cube concerned had retained a height of 10 cm after setting. A foam was characterized as "unstable" if the cube concerned had collapsed when setting. Each test was carried out on 3 cubes of 10×10×10 cm. The results show similar behaviour between the 3 cubes. When applicable, the results expressed are the mean of these 3 cubes.

A column was considered stable if the difference in density between the bottom section and the top section of the column did not exceed 5 kg/m$^3$.

II.2 Thermal Conductivity of the Inorganic Foams

Thermal conductivity was measured using a thermal conductivity measuring device: TC-meter provided by the Company Alphis-ERE (Resistance 5Ω, wire probe 50 mm). Measurement was performed on samples dried at 45° C. to constant weight. The sample was then cut into two equal pieces using a saw. The measuring probe was placed between the two flat surfaces of these two sample halves (sawn sides). Heat was transmitted from the source to the thermocouple through the material surrounding the probe. The temperature increase of the thermocouple was measured as a function of time and allowed the thermal conductivity of the sample to be calculated.

II.3 Density of the Inorganic Foams

The wet density of the foamed cement slurries was measured by weighing the cubes at the time of casting.

The dry density of the samples was measured on the samples dried at 45° C. to constant weight, again by weighing the cubes.

II.4 Results

The results are presented in Table III below.

II.5 Conclusions

These examples make it possible to assess the role of the calcium salt/silicate salt weight ratio in the stability of an inorganic foam. For example, when the calcium/silicon molar ratio is 1.07, 1.45, 1.38 or 1.04, the foam is stable. In the absence of water-soluble calcium salts or water-soluble silicate salts, the foam becomes destabilized and collapses. It can be noted that, for the inorganic foams obtained according to the invention, the nature of the cement used does not influence the stability of the foam.

The invention is not limited to the embodiments presented and other embodiments will be clearly apparent to persons skilled in the art.

The invention claimed is:

1. A process for manufacturing an inorganic foam comprising the following steps:
   (i) separately preparing an aqueous foam and a cement slurry, the cement slurry comprising water W, a cement C, a water-reducing agent, a water-soluble calcium salt, a water-soluble silicate salt, the calcium/silicon molar ratio being 0.7 to 1.7 and the W/C weight ratio being 0.25 to 0.40, wherein the calcium ion concentration is 0.03 to 0.97%, expressed as weight percent relative to the weight of the cement C, and the silicate ion concentration is 0.04 to 1.67%, expressed as weight percent relative to the weight of the cement C;
   (ii) contacting the cement slurry obtained with the aqueous foam to obtain a foamed cement slurry; and
   (iii) shaping the foamed cement slurry obtained in step (ii) and allowing setting to occur.

2. The process according to claim 1, wherein the calcium/silicon molar ratio is 0.8 to 1.5.

3. The process according to claim 1, wherein the W/C ratio is 0.28 to 0.35, expressed by weight.

4. The process according to claim 1, wherein the cement C is a cement of type CEM I, CEM II, CEM III, CEM IV or CEM V.

5. The process according to claim 1, wherein the cement has a Blaine specific surface area of 3,000 to 10,000 cm$^2$/g.

6. The process according to claim 1, wherein the water-reducing agent comprises a plasticizer or superplasticizer.

TABLE III

| | Formula of the inorganic foam of the invention | | | | | | | | | | | |
|---|---|---|---|---|---|---|---|---|---|---|---|---|
| | B | D | F | G | H | I | J | K | L | M | N | O |
| Aqueous foam number | 1 | 2 | 1 | 1 | 1 | 2 | 2 | 1 | 1 | 1 | 1 | 1 |
| Cement slurry formula | II | II | IV | V | VI | V | VI | VII | VIII | IX | X | VI |
| Inorganic foam wet density (g/L) | 114 | 113 | 104 | 105 | 105 | 108 | 107 | 112 | 105 | 110 | 107 | 85 |
| Inorganic foam dry density (g/L) | 62 | nm | nm | nm | 63 | nm | nm | nm | 58 | nm | nm | 43 |
| Stability (cube) | Stable | Stable | Stable | Not stable | Stable | Not stable | Stable | Not stable | Stable | Not stable | Stable | Stable |
| Bubble size (mm) | 1 < x < 2 | 1 < x < 2 | <1 | na | >2 | na | 1 < x < 2 | na | >2 | >2 | | |
| Stability (column) | Stable | nm | nm | Not stable | Stable | Not stable | Stable | Not stable | nm | Not stable | nm | stable |
| Lambda (W/K · m) (TC - meter measurement) | 0.045 | nm | nm | na | 0.048 | na | nm | na | 0.051 | na | nm | 0.038 | nm means not measured.
na means not applicable.
Not stable means that the foam collapsed.

7. The process according to claim 1, wherein the inorganic foam comprises a mineral addition.

8. The process according to claim 1, wherein the inorganic foam comprises substantially no fine particles.

9. The process according to claim 1, wherein the water-soluble calcium salt is selected from the group consisting of calcium chloride, calcium nitrate, calcium formate, calcium acetate, calcium chlorate, calcium bromide, calcium lactate, calcium nitrite, calcium propionate, calcium hydrogen carbonate, calcium iodide and mixtures thereof.

10. The process according to claim 1, wherein the water-soluble silicate salt is selected from the group consisting of the family of sodium silicates (metasilicate, orthosilicate, pyrosilicate), the family of potassium silicates (metasilicate, orthosilicate, pyrosilicate), silicic acid and mixtures thereof.

11. The process according to claim 5, wherein the cement has a Blaine specific surface area of 3,500 to 6,000 $cm^2/g$.

12. An inorganic foam manufactured by the process according to claim 1.

13. The foam according to claim 12, wherein the foam has a dry density of 20 to 300 $kg/m^3$.

14. The foam according to claim 12, wherein the foam has a thermal conductivity of 0.030 to 0.150 W/(m·K).

15. A construction element comprising an inorganic foam according to claim 12.

16. A method comprising manufacturing an insulating material with the inorganic foam according to claim 12.

17. The method according to claim 16, wherein the insulating material is a thermal or sound insulator.

\* \* \* \* \*